US011972361B2

(12) United States Patent
Saha et al.

(10) Patent No.: US 11,972,361 B2
(45) Date of Patent: Apr. 30, 2024

(54) PERFORMANCE OPTIMIZATION OF OBJECT GROUPING SCHEMA IN A NETWORK KEY-VALUE STORAGE DEVICE USING ADAPTIVE REGRESSION

(71) Applicant: SAMSUNG ELECTRONICS CO., LTD., Suwon-si (KR)

(72) Inventors: Somnath Saha, Pleasanton, CA (US); Jian Liang, San Jose, CA (US); Ramaraj Pandian, Cupertino, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 522 days.

(21) Appl. No.: 16/817,460

(22) Filed: Mar. 12, 2020

(65) Prior Publication Data
US 2021/0232946 A1 Jul. 29, 2021

Related U.S. Application Data

(60) Provisional application No. 62/976,281, filed on Feb. 13, 2020, provisional application No. 62/967,231, filed on Jan. 29, 2020.

(51) Int. Cl.
*G06N 5/04* (2023.01)
*G06F 16/2458* (2019.01)
*G06N 20/00* (2019.01)

(52) U.S. Cl.
CPC ........... *G06N 5/04* (2013.01); *G06F 16/2474* (2019.01); *G06N 20/00* (2019.01)

(58) Field of Classification Search
CPC ........ G06K 9/6256; G06N 20/00; G06N 3/08; G06N 3/063

(Continued)

(56) References Cited

U.S. PATENT DOCUMENTS 5,687,396 A 11/1997 Satoh et al.
5,963,963 A 10/1999 Schmuck et al.
(Continued)

FOREIGN PATENT DOCUMENTS

WO 2018218259 A1 11/2018

OTHER PUBLICATIONS

K-Fold Cross Validation—Data Driven Investor-Medium, https://medium.com/datadriveninvestor/k-fold-cross-validation-6b8518070833, 8 pages.
(Continued)

*Primary Examiner* — Hung T Vy
(74) *Attorney, Agent, or Firm* — Lewis Roca Rothgerber Christie LLP (57) ABSTRACT

Provided is a method including receiving object IOs for a target device, grouping the object IOs using a first plurality of input parameters, associating a tracking parameter with the first plurality of input parameters and a performance parameter corresponding to the first plurality of input parameters, storing a first data entry including the tracking parameter, the first plurality of input parameters, and the performance parameter in a database, extracting a plurality of data entries from the database, the plurality of data entries including the first data entry, training a training model using one or more of the plurality of data entries, cross-validating the training model to determine a degree of error reduction of the training model, performing a model check to compare the training model to an inferencing model, and updating the inferencing model based on the model check.

17 Claims, 5 Drawing Sheets

(58) Field of Classification Search
USPC .......................................................... 706/123
See application file for complete search history.

(56) References Cited

U.S. PATENT DOCUMENTS

| | | | |
|---|---|---|---|
| 6,367,002 | B1 | 4/2002 | Birkhauser |
| 6,832,280 | B2 | 12/2004 | Malik et al. |
| 7,831,772 | B2 | 11/2010 | Nalawade et al. |
| 8,612,668 | B2 | 12/2013 | Nishimoto et al. |
| 8,738,841 | B2 | 5/2014 | Olbrich et al. |
| 8,793,531 | B2 | 7/2014 | George et al. |
| 8,825,963 | B1 | 9/2014 | Edwards et al. |
| 9,009,392 | B2 | 4/2015 | Jain et al. |
| 9,075,710 | B2 | 7/2015 | Talagala et al. |
| 9,251,058 | B2 | 2/2016 | Nellans et al. |
| 9,298,376 | B2 | 3/2016 | Colgrove et al. |
| 9,760,574 | B1 | 9/2017 | Zhai et al. |
| 9,965,196 | B2 | 5/2018 | Singh et al. |
| 9,990,687 | B1* | 6/2018 | Kaufhold ............ G06K 9/6247 |
| 10,430,103 | B1 | 10/2019 | Jamail et al. |
| 10,769,064 | B1 | 9/2020 | Twitto |
| 2009/0210620 | A1 | 8/2009 | Jibbe et al. |
| 2016/0041918 | A1 | 2/2016 | Jeong et al. |
| 2016/0210060 | A1 | 7/2016 | Dreyer |
| 2018/0107601 | A1 | 4/2018 | Jin et al. |
| 2018/0173572 | A1* | 6/2018 | Bequet ................ G06N 3/0454 |
| 2018/0349275 | A1 | 12/2018 | Ren et al. |
| 2018/0357152 | A1* | 12/2018 | Browne ............. G06F 11/3664 |
| 2018/0357234 | A1 | 12/2018 | De |
| 2019/0244140 | A1 | 8/2019 | Lee et al. |
| 2019/0370088 | A1 | 12/2019 | Chen et al. |
| 2020/0034665 | A1* | 1/2020 | Ghanta ................. G06N 20/00 |

OTHER PUBLICATIONS 11.7 Cross-Validation, STAT 462, Applied Regression Analysis, https://online.stat.psu.edu/stat462/node/200/, 2 pages.

Cross-validation (statistics), Wikipedia, https://en.wikipedia.org/wiki/Cross-validation (statistics), 13 pages.

Li, Gang et al., "Prediction Accuracy Measures for a Nonlinear Model and for Right-Censored Time-to-Event Data," Nov. 9, 2016, https://arxiv.org/pdf/1611.03063.pdf, 40 pages.

"Tutorial: Understanding Regression Error Metrics in Python", https://www.dataquest.io/blog/understanding-regression-error-metrics/, 7 pages.

Ng, Ritchie, "Evaluating a Linear Regression Model", https://www.ritchieng.com/machine-learning-evaluate-linear-regression-model/, 9 pages.

U.S. Office Action dated Jul. 19, 2021, issued in U.S. Appl. No. 16/815,974 (19 pages).

Summons to Attend Oral Proceedings for EP Application No. 21155971.1 dated Oct. 12, 2023, 9 pages.

* cited by examiner

PERFORMANCE OPTIMIZATION OF OBJECT GROUPING SCHEMA IN A NETWORK KEY-VALUE STORAGE DEVICE USING ADAPTIVE REGRESSION

CROSS-REFERENCE TO RELATED APPLICATION(S)

This application claim priority to, and the benefit of, U.S. Provisional Application Ser. No. 62/967,231, filed Jan. 29, 2020, entitled "GROUPING KV OBJECT IOS TO OPTIMIZE IO PERFORMANCE/OBJECT GROUP CLIPPING SCHEMA TO BOOST SMALL K/V OBJECT IO PERFORMANCE" and U.S. Provisional Application Ser. No. 62/976,281, filed Feb. 13, 2020, entitled "PERFORMANCE OPTIMIZATION OF OBJECT GROUPING SCHEMA IN A NETWORK KEY-VALUE STORAGE DEVICE USING ADAPTIVE REGRESSION", the contents of which being incorporated herein by reference in their entirety. This application contains subject matter disclosed in a co-pending U.S. application Ser. No. 16/815,974, filed on Mar. 11, 2020, entitled "GROUPING KEY VALUE OBJECT IOs TO IMPROVE IO PERFORMANCE FOR KEY-VALUE STORAGE DEVICES," the content of which is hereby incorporated by reference in its entirety.

FIELD

One or more aspects of embodiments of the present disclosure relate generally to optimizing input/output ("IO") performance for key-value solid state drives ("KV-SSDs").

BACKGROUND

In recent years, KV-SSDs have been used in an increasing variety of applications. Therefore, enhancing IO performance for KV-SSDs to enhance throughput and to reduce latency may be beneficial.

However, enhanced IO performance may be difficult when KV-SSDs encounter a mixture of both large object IOs and small object IOs because KV-SSD processing may address both large object IOs and small object IOs in the same manner.

As a result, KV-SSD processing may favor large object IOs, which results in small object IOs having higher latency. Alternatively, KV-SSD processing may favor small object IOs, which results in large object IOs having lower throughput.

SUMMARY

Aspects of embodiments of the present disclosure are directed toward a system and method that improves or optimizes performance of an object grouping schema using an adaptive regression model.

Aspects of embodiments of the present disclosure are directed toward a system and method that updates an inferencing model for inferring suitable input parameters for the object grouping schema where the inferencing model is incrementally trained using an adaptive regression model.

According to one embodiment of the present disclosure, there is provided a method of optimizing or improving parameters for grouping object IOs, the method including receiving object IOs for a target device, grouping the object IOs using a first plurality of input parameters, associating a tracking parameter with a first plurality of input parameters and a performance parameter corresponding to the first plurality of input parameters, storing a first data entry including the tracking parameter, the first plurality of input parameters, and the performance parameter in a database, extracting a plurality of data entries from the database, the plurality of data entries including the first data entry, training a training model using one or more of the plurality of data entries, cross-validating the training model to determine a degree of error reduction of the training model, performing a model check to compare the training model to an inferencing model, and updating the inferencing model based on the model check.

The method may further include determining the performance parameter corresponding to the first plurality of input parameters.

The plurality of data entries may further include a plurality of historical data entries, and the method further includes using the plurality of historical data entries to train or cross-validate the inferencing model.

The method may further include using the inferencing model to infer a second plurality of input parameters for grouping the object IOs in response to the performance parameter being outside an expected range.

The method may further include pre-processing the plurality of data entries to remove data entries that reduce a predictive ability of the training model.

The performance parameter may include input/output operations per second, and the first plurality of input parameters may include object group size and flash out time.

The database may include a time-series database.

The cross-validating the training model may be performed according to a k-fold cross-validation method.

According to another embodiment of the present disclosure, there is provided a non-transitory computer readable medium implemented on a system for optimizing or improving parameters for grouping object IOs, the non-transitory computer readable medium having computer code that is configured, when executed on a processor, to implement a method of optimizing or improving parameters for grouping object IOs, the method including receiving object IOs for a target device, grouping the object IOs using a first plurality of input parameters, associating a tracking parameter with the first plurality of input parameters and a performance parameter corresponding to the first plurality of input parameters, storing a first data entry including the tracking parameter, the first plurality of input parameters, and the performance parameter in a database, extracting a plurality of data entries from the database, the plurality of data entries including the first data entry, training a training model using one or more of the plurality of data entries, cross-validating the training model to determine a degree of error reduction of the training model, performing a model check to compare the training model to an inferencing model, and updating the inferencing model based on the model check.

The computer code, when executed by the processor, may further implement the method of optimizing or improving parameters for grouping object IOs by determining the performance parameter corresponding to the first plurality of input parameters.

The plurality of data entries may further include a plurality of historical data entries, and the computer code, when executed by the processor, may further implement the method of optimizing or improving parameters for grouping object IOs by using the plurality of historical data entries to train or cross-validate the inferencing model.

The computer code, when executed by the processor, may further implement the method of optimizing or improving parameters for grouping object IOs by using the inferencing model to infer a second plurality of input parameters for grouping the object IOs in response to the performance parameter being outside an expected range.

The computer code, when executed by the processor, may further implement the method of optimizing or improving parameters for grouping object IOs by pre-processing the plurality of data entries to remove data entries that reduce a predictive ability of the training model.

The performance parameter may include input/output operations per second, and the first plurality of input parameters may include object group size and flash out time.

The database may include a time-series database.

Cross-validating the training model may be performed according to a k-fold cross-validation method.

According to yet another embodiment of the present disclosure, there is provided a system for optimizing or improving parameters for grouping object IOs, the system including a target including a memory cache, wherein the target is configured to receive object IOs for a target device, group the object IOs using a first plurality of input parameters, associate a tracking parameter with the first plurality of input parameters and a performance parameter corresponding to the first plurality of input parameters, and transmit a first data entry including the tracking parameter, the first plurality of input parameters, and the performance parameter to a database, and a training circuit configured to extract a plurality of data entries from the database, the plurality of data entries including the first data entry, train a training model using one or more of the plurality of data entries, cross-validate the training model to determine a degree of error reduction of the training model, perform a model check to compare the training model to an inferencing model, and update the inferencing model based on the model check.

The target may be further configured to determine the performance parameter corresponding to the first plurality of input parameters.

The plurality of data entries may further include a plurality of historical data entries, and the training circuit is further configured to use the plurality of historical data entries to train or cross-validate the inferencing model.

The system may further include an inferencing circuit configured to infer a second plurality of input parameters for grouping the object IOs in response to the target determining that the performance parameter is outside an expected range.

The training circuit may be further configured to pre-process the plurality of data entries to remove data entries that reduce a predictive ability of the training model.

The performance parameter may include input/output operations per second, and the first plurality of input parameters include object group size and flash out time.

The database includes a time-series database.

Accordingly, the system according to embodiments of the present disclosure uses an adaptive regression model to infer and/or apply suitable input parameters to improve or optimize performance of the object grouping schema.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown in order to facilitate a less obstructed view of these various embodiments and to make the description clear.

DETAILED DESCRIPTION

Features of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described.

Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (e.g., the limitations of the measurement system).

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented using any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
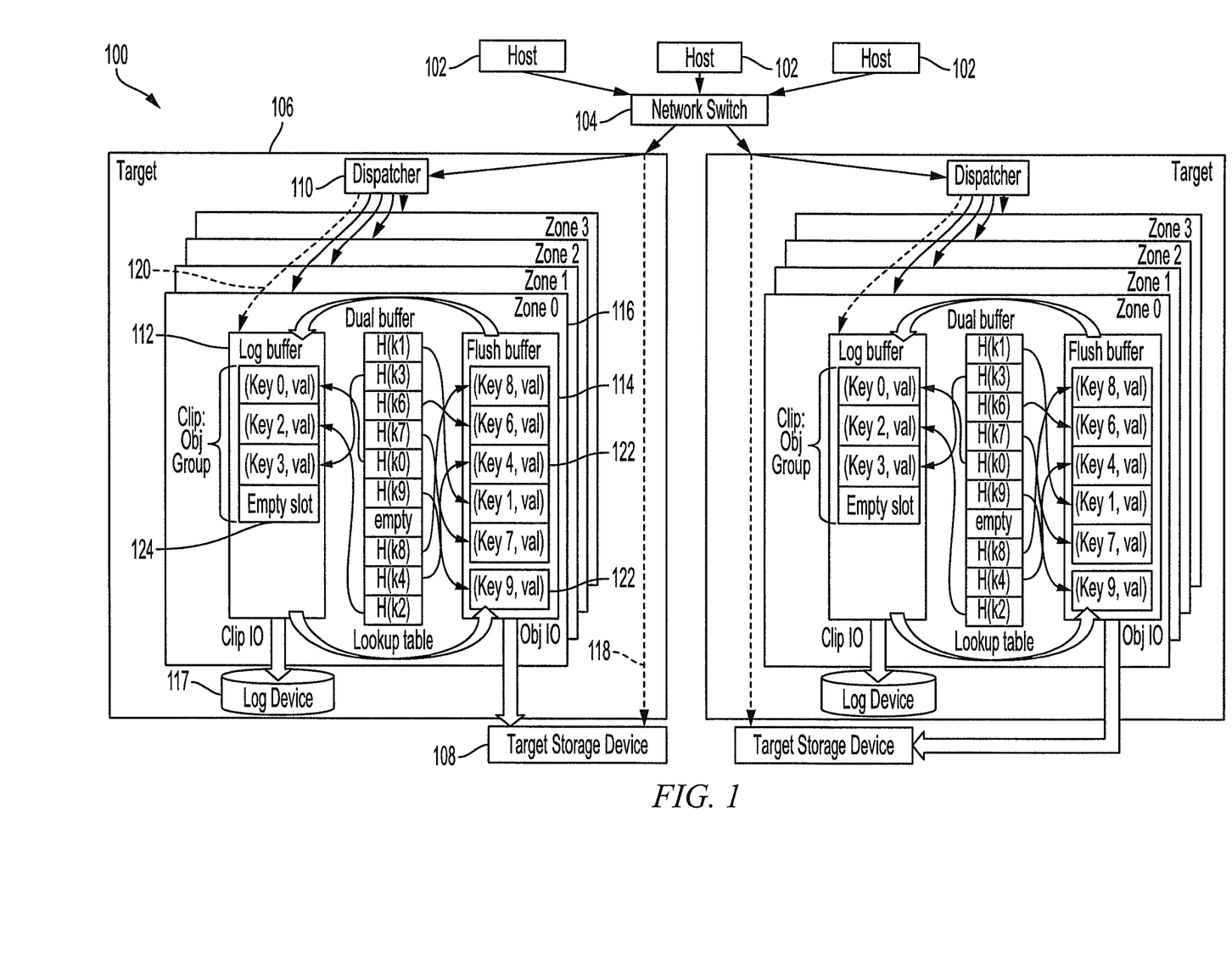
FIG. 1 is a block diagram depicting a network and object grouping schema according to one or more embodiments of the present disclosure.

FIG. 1 is a block diagram depicting a network according to one or more embodiments of the present disclosure.

Referring to FIG. 1, a network 100 according to one or more embodiments of the present disclosure follows a NVMeoF (Non-Volatile Memory Express over Fabrics) architecture. In one or more embodiments, the network 100 includes one or more hosts 102, a network switch 104 (e.g., a NVMeoF switch), one or more targets 106 (e.g., a NVMe target), and one or more target storage devices 108 (e.g., NVMe-based Key-Value SSD or KV-SSD).

With reference to FIG. 1, one or more hosts 102 may generate one or more IO requests according to data processing applications or software. The IO requests may include IO operations such as "put", "get", "delete", etc., for object-based storage (e.g., for key-value storage). The IO requests may include different IO sizes (e.g., small object IOs and/or large object IOs). The one or more hosts 102 may forward or transmit one or more requests to the network switch 104, such as a multi-port network bridge that connects devices together on a computer network. The network switch 104 may use hardware addresses to process and forward data. Therefore, the network switch 104 may transmit the one or more IO requests to a suitable target 106 from among one or more targets 106.

A target 106 from among the one or more targets 106 may include a dispatcher 110, a memory cache (e.g., a dynamic random access memory (DRAM) cache), and a log device 117 (e.g., a low latency log device). The dispatcher 110 may be a KV IO dispatcher for receiving and dispatching one or more IOs from the network switch 104 to portions of the memory cache. The memory cache may include one or more zones 116, which may be formed by partitions in the memory cache, for receiving and handling small object IOs from the dispatcher 110.

The zone(s) 116 may include a flush buffer 114 that flushes object IOs to the target storage device 108 (e.g., to a KV-SSD) to complete an IO. The zone(s) 116 may also include a log buffer 112 that receives the one or more small object IOs dispatched from the dispatcher 110. For example, at least two zones may each include a log buffer that receives one or more respective small object IOs dispatched from the dispatcher 110. The dispatcher 110 may dispatch one or more IOs (referred to as sets) to corresponding log buffers in multiple zones.

The log buffer 112 may log or store object IOs received from the dispatcher 110 in the log device 117. As an example, the log device 117 may be a non-volatile dual in-line memory module (NVDIMM) or a low latency SSD for crash recovery purposes.

The log device 117 may maintain a log in persistent memory that can be checked after a system crash to determine whether respective IOs are completed. If one or more IOs are not completed, the system can determine what additional steps, if any, may be suitable to complete any uncompleted IOs based on the log. The log device 117 may suitably use less storage capacity than a target storage device 108 (e.g., to save on cost).

Depending on the size of the object IOs received from the network switch 104, the target 106 may determine a path for the object IO. For example, the target 106 may include a first path (e.g., a normal path) 118 through which one or more large object IOs received by the target 106 may pass directly to the target storage device 108 without being received by the log buffer 112, such that the object IOs may be stored in the log device 117. Large object IOs may be object IOs that are at or above a threshold size, wherein the threshold size may be adjustable in one or more embodiments.

The target 106 may also include a second path (e.g., a grouping path) 120 through which one or more small object IOs are received by the dispatcher 110. The small object IOs may be object IOs below the threshold size. On the second path 120, the dispatcher 110 may dispatch or transmit the one or more small object IOs to a corresponding zone 116 (e.g., to the log buffer 112 of the zone 116). The one or more small object IOs on the second path 120 may be concatenated in the log buffer 112 to form an object group 124, or clip, according to a grouping schema according to one or more embodiments of the present disclosure.

Accordingly, as described above, object IOs may be screened by an adjustable size threshold, and large object IOs may follow a first path 118 while small object IOs follow a second path 120 according to an object grouping schema, the details of which are described in the cross-referenced co-pending U.S. application Ser. No. 16/815,974, filed on Mar. 11, 2020, entitled "GROUPING KEY VALUE OBJECT IOs TO IMPROVE IO PERFORMANCE FOR KEY-VALUE STORAGE DEVICES."

For example, in one or more embodiments, the log buffer 112 on the second path 120 may receive small object IOs until a condition or trigger is reached (e.g., until an object group size surpasses a threshold or maximum size, until a maximum number of small object IOs have been formed into an object group, and/or until a timeout window has lapsed, wherein the threshold, maximum number, and/or timeout window are adjustable in one or more embodiments). The timeout window refers to a time period during which small object IOs is received by, or within, the log buffer 112. For example, the time period may be set according to latency and throughput suitability of the small object IOs according to an object group and/or zone.

After a condition or trigger for the log buffer 112 is satisfied, the log buffer 112 may log the one or more small object IOs that have been concatenated into an object group 124 to the log device 117. The log buffer 112 may change roles to function as the flush buffer after logging the small object IOs to the log device 117. In this manner, the flush buffer 114 may have stored therein an object group, or clip, 122 including small object IOs. The flush buffer may include multiple object groups 122. In this case, multiple log buffers may change roles to function as flush buffers (e.g., thereby forming a single flush buffer that is greater size). In other words, according to one or more embodiments, there is one buffer that may be partitioned as a plurality of buffers or buffer sections. Typically, one of the partitioned buffers operates as a log buffer, and there could be one or more flush buffers. The small object IOs are stored in the log buffer until the log buffer is full, after which the log buffer may change function to that of the flush buffer.

Upon reaching a certain condition, such as a threshold flush buffer size and/or a threshold idle period (e.g., based on an elapsed time of object IOs being present in the flush buffer), the flush buffer may flush the contents of the flush buffer (e.g., may flush the object group 122) to the target storage device 108. Then, the contents of the flush buffer may be marked for deletion to purge the contents of the flush buffer to thereby free up space in the memory cache when the flush buffer is emptied and the object IOs are completed.

After the flush buffer is emptied, the flush buffer may be available to change roles to function as a log buffer 112, thereby fulfilling a single log-flush cycle. In one or more embodiments, multiple log-flush cycles for different portions of the memory cache may occur concurrently (e.g., simultaneously or substantially simultaneously). Also, the threshold flush buffer size and/or threshold idle period may be adjustable (e.g., by an algorithm, application programing interface, configuration file, or any other suitable method) known to those skilled in the art.

Although the term "object group" is used throughout the specification, if a single small object IO is received and no other small object IOs are received by the log buffer 112 within the receiving period, then concatenation may not occur and the "object group" may include a single small object IO.

Accordingly, an object group, or clip, including one or more small object IOs is formed in the log buffer 112. The concatenated object group 124 may be treated as a single large object IO (due to concatenation) for the purpose of writing small object IOs to a storage device, such as the log device 117, and to the target storage device 108, such as the KV-SSD. In this manner, average latency and throughput for small object IOs may be enhanced because the small object IOs are treated as a single large object IO.

Although the target storage device 108 is depicted in FIG. 1 as separate from the target 106, the classification of the target storage device 108 is not limited thereto, and the target storage device 108 could be considered part of the target 106 in other embodiments. Further, while three hosts 102, two targets 106, and two target storage devices 108 are illustrated in FIG. 1, any number of hosts, targets, and target storage devices may be used with suitable modifications to the inputs and outputs of each host 102, target 106, and target storage device 108. Accordingly, the network switch 104 may transmit IO requests to multiple targets 106 associated with one or more target storage devices 108. As a result, the NVMeoF architecture may connect multiple KV-SSDs (e.g. thousands or more KV-SSDs housed in dedicated storage servers) to hosts.

FIGS. 2A-2D is a flow chart illustrating a method of updating parameters for the object grouping schema according to one or more embodiments of the present disclosure.

Referring to FIGS. 2A-2D, the system and method of the present disclosure includes an object storage application 202, one or more hosts 204, a target 106, a database 206, a training circuit 208, and an inferencing circuit 210.

In one or more embodiments, the object storage application 202 interacts with one or more hosts 204 to generate and transmit IOs. In one or more embodiments, the one or more hosts 204 run a host-side software program that interacts with an external second software program based on a mode of operation. For example, in a pass-through mode, the external software program determines which path data should take to reach a particular target (e.g., which target among one or more targets), and, in a nonpass-through mode, the host-side software program determines which path data should take to reach a particular target (e.g., the target 106).

In one or more embodiments, a target 106 tracks parameter data 212 associated with the object grouping schema described with respect to FIG. 1. In one or more embodiments, the parameter data 212 includes tracking parameters 214, input parameters 216, and performance parameters 218.

In one or more embodiments, the tracking parameters 214 may include data indicating when input parameters 216 and performance parameters 218 are collected, for example, a time-stamp or any other suitable parameter for determining when data collection occurred. Tracking parameters may also include the number of operating CPU cores and/or threads available as determined by a user or specified at start up in a first software module (e.g., a Key Value Storage Application of the target) 220 for the object grouping schema. Multiple zones may follow the object grouping schema and each zone may have a single thread working in that zone. Each thread runs on a particular CPU core, and therefore, an increase in the cores or threads assigned to work on a zone (assuming zones are available) may improve the performance of the object grouping schema for high frequency small object IOs. Accordingly, the core or thread count is relevant to an assessment of performance parameters such as input/output operations per second ("IOPS") for determination of an inferencing model (e.g., a golden model or a reference model that is used for inferring input parameters) as described in more detail below.

In one or more embodiments, the input parameters 216 may include parameters for the object grouping schema that may be adjusted (e.g., via a remote procedure call (an "RPC call")) while the first software module 220 is online. For example, input parameters 216 include object group size and flash out time (e.g., maximum latency time permitted for Flash out time may be measured from the time period beginning when a small object IO is received by the log buffer and ending when the small object IO is flushed to the target storage device. Input parameters 216 may also include the object size being screened for the first and second paths. Input parameters 216 may also include the number of zones allocated for processing small object IOs via the log buffer. For example, it may be desirable to have a higher number of zones for processing when small object IO frequency is high and it may be desirable to have a lower number of zones for processing when small object IO frequency is low. Although several input parameters 216 are discussed, all or less than all of the discussed input parameters 216 may be recorded, stored, and/or adjusted in one or more embodiments, for example, in one embodiment flash out time and object group size is adjusted and in another embodiment number of zones may be adjusted in addition to the flash out time and object group size.

In one or more embodiments, the performance parameters 218 may include parameters indicating the performance of the object grouping schema such as IOPS (i.e., IOs completed per second) and/or latency. Latency refers to the time an object takes to return. In other words, the time period beginning when an object IO is received by a device and ending when a response is sent back to a requesting device.

Generally, it is desirable to improve or optimize performance parameters 218 (e.g., maximizing IOPS and/or reducing average latency) using the object grouping schema. However, IOPS and/or latency may vary as IOs transmitted to the target 106 change throughout the day. For example, if the input parameters 216 are fixed, then changes to the IO frequency, mixture, and/or size may result in suboptimal input parameters for the object grouping schema. Therefore, changes in the inbound IOs may result in a decrease in IOPS because object group size and flash out time are not updated. For example, at the peak hours, the system may experience a high volume of IO operation. Accordingly, the performance of the object grouping schema may degrade if suitable values for the input parameters 216 such as object group size and flash out time are not set in a timely manner. Therefore, aspects of embodiments of the present disclosure are directed toward a method of optimizing or improving performance parameters 218 by adjusting input parameters 216.

In one or more embodiments, parameter data 212 is collected according to a data capture process for analysis. The data capture process may include storing parameter data 212 on a database (e.g., a time series database) 206. The data may be transmitted by running the first software module 220 (e.g., the Key Value Storage Application) and a second software module 222 (e.g., an Agent) that runs on the target node of the target 106. The first software module 220 stores and reads parameter data 212 while the second software module 222 polls the first software module 220 for health statistics from the storage application to be stored on the database 206.

The data capture process may occur when object group IOs are completed as desired. For example, the data capture process may occur when every object group is flushed to the target storage device, when every other object group is flushed to the target storage device, or any other suitable sampling (e.g., any number) of object groups are flushed to the target storage device. Sampling data over time enables the database 206 to capture additional parameter data 212 throughout the day.

Figure 2A:
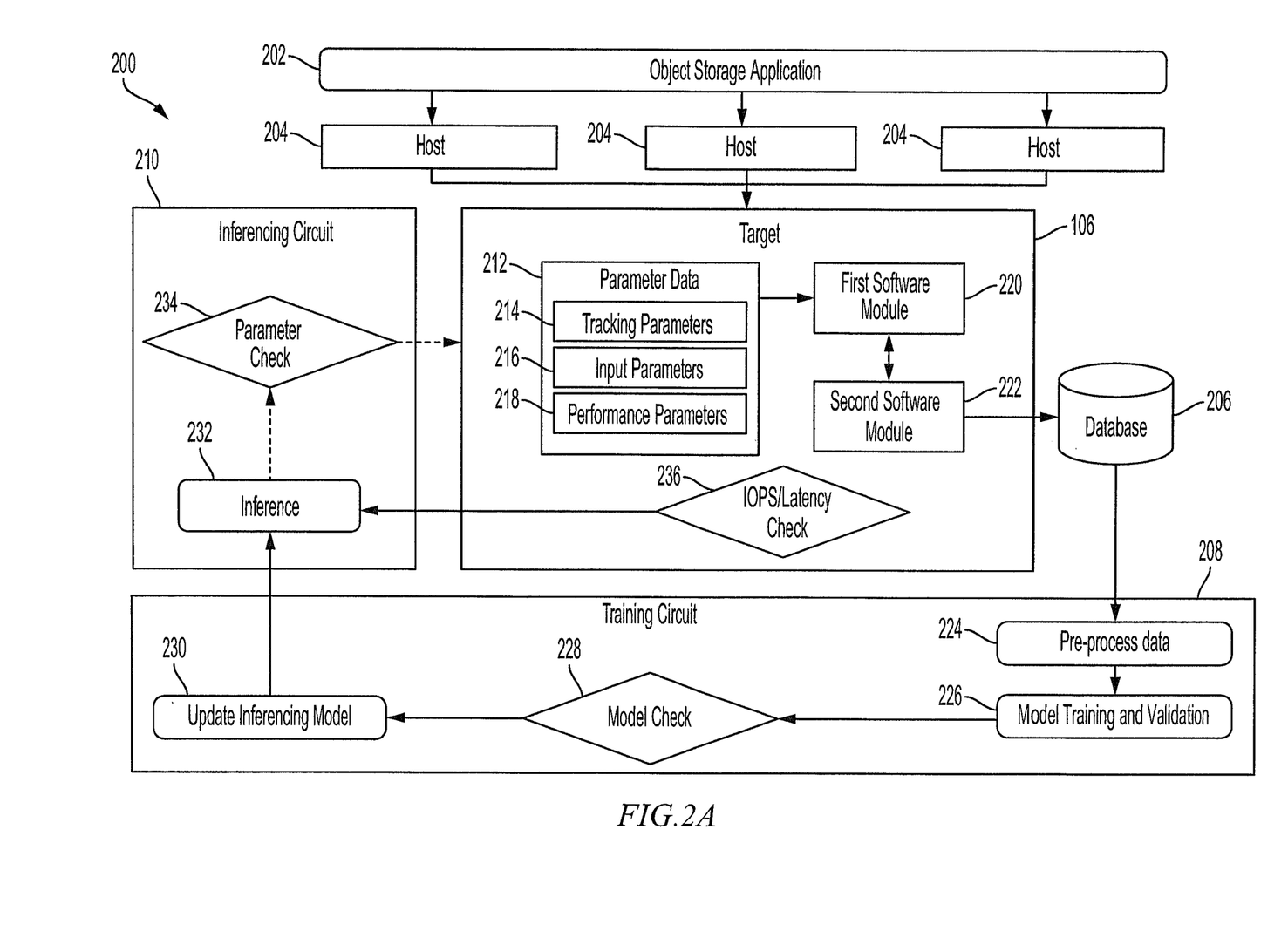
FIGS. 2A-2D is a flow chart illustrating a method of updating parameters for the object grouping schema according to one or more embodiments of the present disclosure.
Figure 2B:
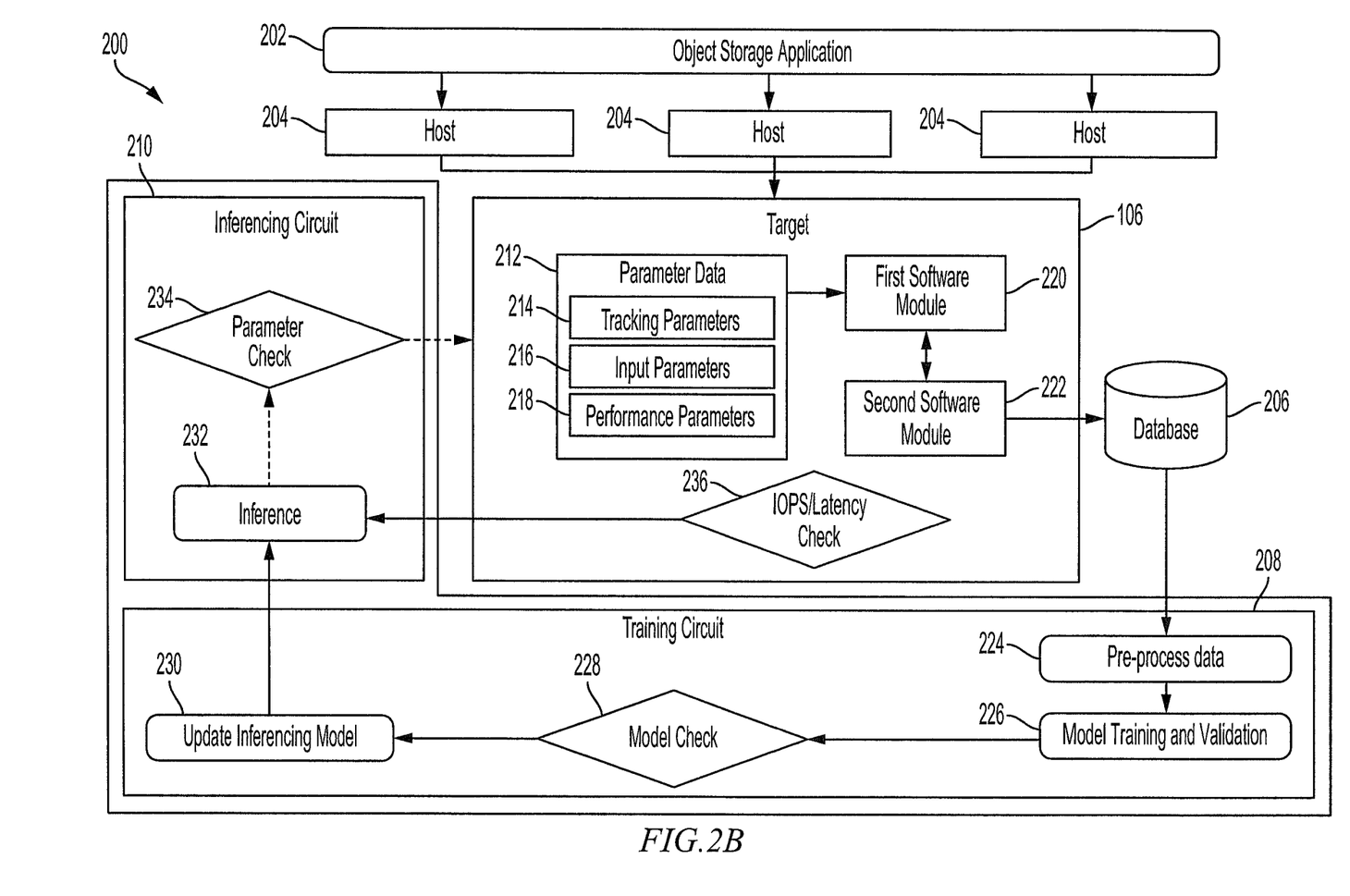
Figure 2C:
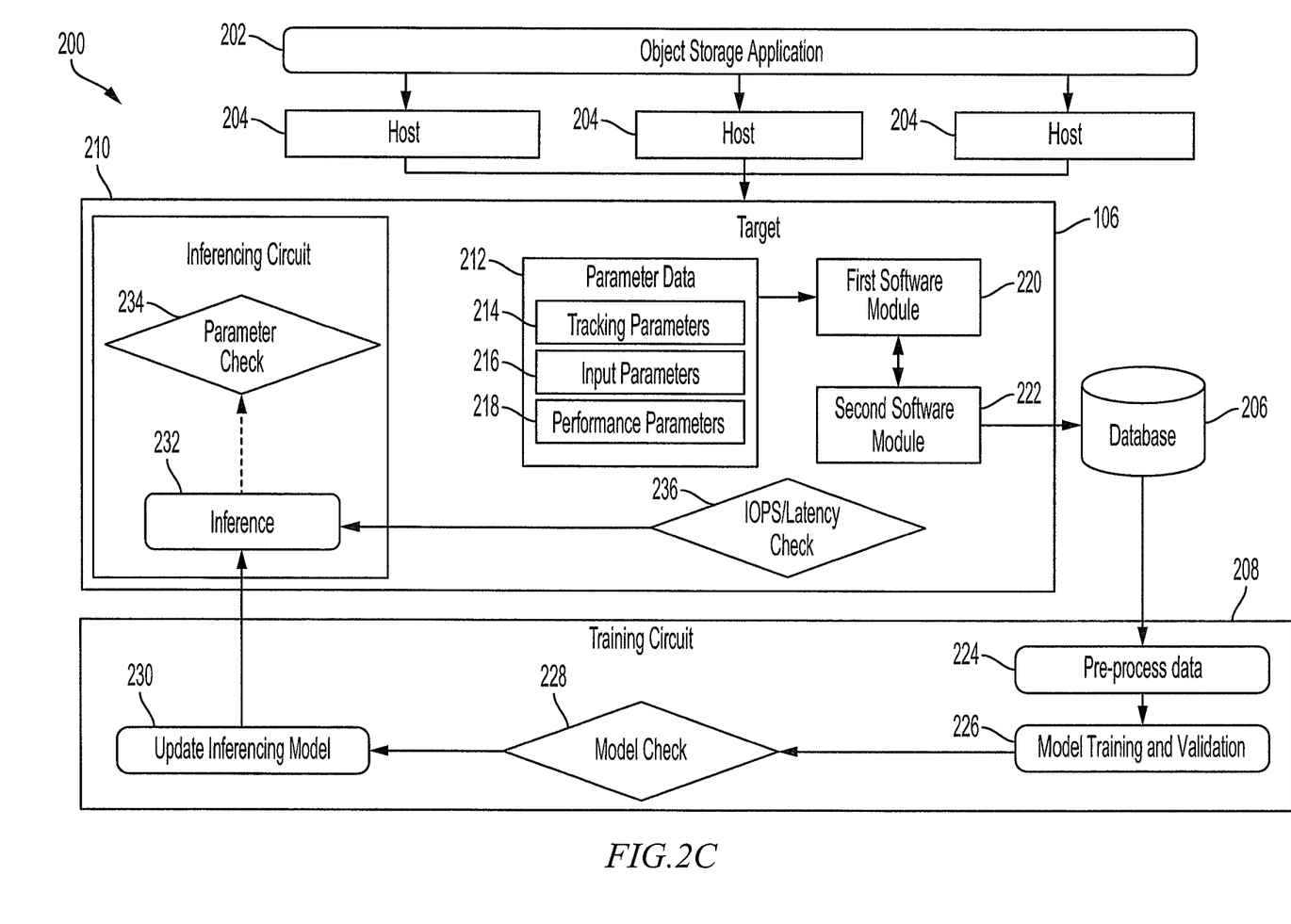
Figure 2D:
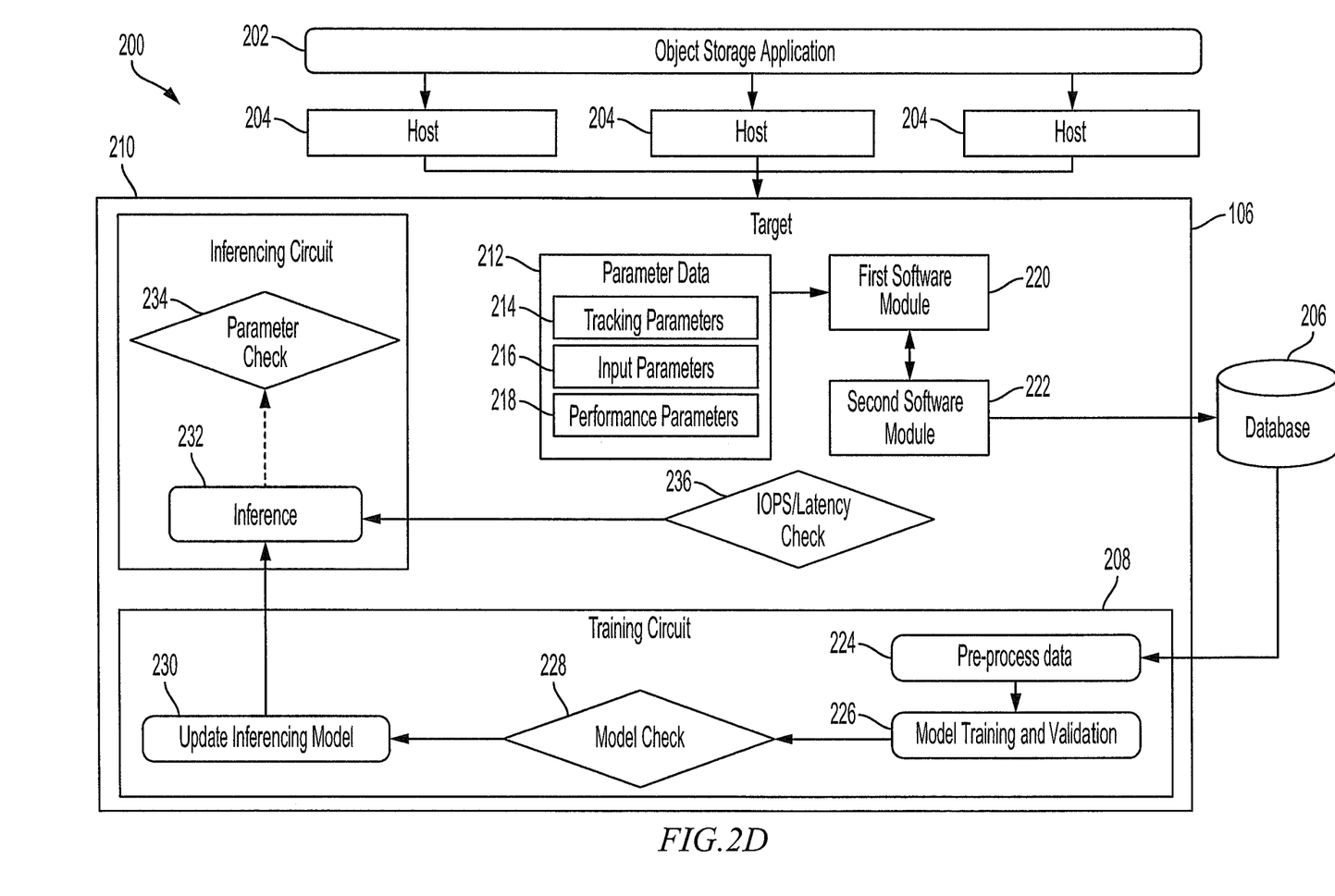

In one or more embodiments, a training circuit 208 receives or extracts parameter data 212 from the database 206. The training circuit 208 may extract all or substantially all data relating to the target 106 from the database 206. The training circuit 208 may receive or extract data from the database 206 at set intervals, for example, time-based intervals (e.g., once a day, twice a day, three times a day, etc.) as desired. In one or more embodiments, the training circuit 208 receives or extracts data at off-times or nonpeak hours when the system that the training circuit 208 is a part of has more resources to perform pre-processing (224), model training and validation (226), model checks (228), and/or inferencing model updates (230). In one or more embodiments, the training circuit 208 is separate from the target 106 as illustrated in FIGS. 2A-2C, however, in one or more embodiments the training circuit 208 is integrated with the target 106 as illustrated in FIG. 2D. Accordingly, the training circuit 208 in the embodiments of FIGS. 2A-2C may be separate from the target 106 to avoid burdening the target 106 with pre-processing (224), model training and validation (226), model checks (228), and/or inferencing model updates (230). In the embodiment of FIG. 2D, the target 106 may include, but is not limited to, a device optimized or configured for training to function as the training circuit 208. In one or more embodiments, the training circuit 208 may be implemented in any suitable number and types of chips that are known to those skilled in the art. By way of example, the training circuit 208 may include any suitable software and hardware, for example, the training circuit may include an FPGA, GPU, and/or any other suitable chips or components of a chip, and/or one or more discrete analog or digital elements, where one or more of these components and/or functions may be integrated in a single integrated circuit (IC) chip.

As illustrated in FIGS. 2A-2D, the parameter data 212 received or extracted from the database 206 may be pre-processed (224) by the training circuit 208. Pre-processing (224) the extracted data may include removing bad data (e.g., data entries that reduce or negatively impact a predictive ability of a training model). For example, data entries that reduce or negatively impact the predictive ability of the training model may include missing or unexpected values (or values outside an expected range). In a non-limiting example, in one or more embodiments, a single data entry may include a timestamp, object group size, flash out time, thread count, and IOPS. If any of these parameters are not present in the extracted data, then pre-processing (224) may remove the entire data entry. As another example, if any of these parameters have an unexpected value, then the entire data entry may be removed. For example, if the parameters are outside an expected range or the parameters are a negative value, then pre-processing may remove the entire data entry. In one or more embodiments, the pre-processed data entry that is removed prior to training is also removed from the database 206.

After pre-processing (224) the data, the training circuit trains a training model (226). In one or more embodiments, the training model is based on all or substantially all data extracted from the database 206 including any new and historical data stored on the database 206. The inclusion of historical data in addition to new data over multiple training cycles results in an incremental learning approach. Therefore, in one or more embodiments, the historical data may capture at least the data on which a current inferencing model is based.

In one or more embodiments, the training circuit 208 performs cross-validation (226) on the training model. For example, cross-validation is performed on a data sample (e.g., from the database 206) where the data sample includes a training set that is used to train the training model and a validation set that evaluates the predictive ability of the training model. In one or more embodiments, cross-validation (226) is performed by k-fold cross validation. For example, the k-fold cross validation method according to one or more embodiments divides a data sample into K sets where one set is used for validation and (K−1) set(s) are used for training the model. This process may be repeated K times where the K results are averaged out. Although the K-fold cross-validation method is described with reference to cross-validation, any other suitable method of cross-validation may be used.

In one or more embodiments, the training circuit 208 performs a model check (228) on the training model to determine if the accuracy or error reduction (e.g., a degree of error reduction) of the training model is better than the accuracy or error reduction of an inferencing model. For example, the training model may be evaluated based on error reduction which refers to how concentrated data points are. In one or more embodiments, error reduction is measured using an error handling functions, such as Mean Squared Error (MSE), Root Mean Squared Error (RMSE), R^2, and/or etc. For example, in one or more embodiments, the RMSE value for each k-fold validation (e.g., training/test split) is gathered and averaged out for comparison to the inferencing model. Although specific error handling functions are described for performing the model check, in one or more embodiments, other suitable error handling functions may be used.

If the accuracy or error reduction of the training model is greater than or better than the accuracy or error reduction of the inferencing model, then the training circuit 208 updates the inferencing model (230) based on the training model. In one or more embodiments, the training circuit 208 replaces the inferencing model with the training model to create a new inferencing model. Conversely, if the accuracy or error reduction of training model is less than or worse than the accuracy or error reduction of the inferencing model, then the training model is rejected and the inferencing model remains unchanged. Accordingly, the inferencing model may be incrementally updated (230) over time to become more robust based on historical data stored on the database 206.

In one or more embodiments, the target 106 may perform an IOPS and/or latency check (236) and determine that the performance parameters 218 is outside of an expected range. In one or more embodiments, for example, the target 106 may continuously monitor IOPS for the target to check whether IOPS fall outside a range of about 5% to about 10% of an expected IOPS value. When one or more performance parameters 218 (e.g., IOPS and/or latency) are outside the expected range, the inferencing model may be used by an inferencing circuit 210 to infer (232) suitable input parameters (e.g., object group size, flash out time, etc.). The inferencing circuit 210 may perform a parameter check (234) by comparing the inferred input parameters to the input parameters 216 of the target 106. If the inferred input parameters and the input parameters 216 of the target 106 are the same then no action is taken. If the inferred input parameters are different from the input parameters 216 of the target 106, then the inferencing circuit 210 may update (e.g., via an RPC call) the input parameters 216 of the target 106.

In one or more embodiments, the inferencing circuit 210 is separate from the target 106 to avoid burdening the target 106 with inferencing as illustrated in the embodiments of FIGS. 2A and 2B, and in one or more embodiments, the inferencing circuit 210 is a part of the target 106 as illustrated in the embodiments of FIGS. 2C and 2D. Although the inferencing circuit 210 is depicted in the illustrated embodiments as separate from the training circuit 208, in one or more embodiments, the inferencing circuit 210 may be a part of the same device as the training circuit 208 as illustrated in the embodiment of FIG. 2B. In one or more embodiments, the inferencing circuit 210 may be implemented in any suitable number and types of chips that are known to those skilled in the art. By way of example, the inferencing circuit 210 may include any suitable software and/or hardware including, for example, an FPGA and/or GPU based accelerator for fast inferencing, and/or any other suitable chips or components of a chip, and/or one or more discrete analog or digital elements, where one or more of these components and/or functions may be integrated in a single chip.

Accordingly, as disclosed herein, embodiments of the present disclosure improve IOPS and/or latency of the object grouping schema by adjusting input parameters such as object group size, flash out time, number of zones, and/or etc., to improve performance.

While the present disclosure has been particularly shown and described with reference to some embodiments thereof, it will be understood by those of ordinary skill in the art that various changes in form and details may be made therein without departing from the spirit and scope of the present disclosure as set forth in the following claims and their equivalents.

What is claimed is:

1. A method comprising:
receiving a first object input/output (IO) for a target device;
grouping the first object IO with one or more other object IOs using a first input parameter;
associating a tracking parameter with the first input parameter and with a performance parameter corresponding to the first input parameter;
storing a first data entry comprising the tracking parameter, the first input parameter, and the performance parameter in a database;
extracting, the first data entry from the database;
training a training model using the first data entry;
performing a model check to compare the training model to an inferencing model;
determining that the training model is more accurate than the inferencing model based on a comparison of a performance of the training model to a performance of the inferencing model;
updating the inferencing model by performing an inference with the training model; and using the inferencing model to infer a second input parameter for grouping a second object IO with another one or more other object IOs in response to the performance parameter being outside an expected range.

2. The method of claim 1, further comprising cross-validating the training model to determine a degree of error reduction of the training model and using a historical data entry to train or cross-validate the inferencing model.

3. The method of claim 2, wherein the cross-validating the training model is performed according to a k-fold cross-validation method.

4. The method of claim 1, further comprising pre-processing one or more data entries to remove a data entry that reduces a predictive ability of the training model.

5. The method of claim 1, wherein the performance parameter comprises IO operations per second, and
wherein the first input parameter comprises object group size or flash out time.

6. The method of claim 1, wherein the database comprises a time-series database.

7. A non-transitory computer readable medium implemented on a system for improving parameters for grouping an object input/output (IO), the non-transitory computer readable medium having computer code that is configured to implement a method comprising:
receiving a first object IO for a target device;
grouping the first object IO with one or more other object IOs using a first input parameter;
associating a tracking parameter with the first input parameter and with a performance parameter corresponding to the first input parameter;
storing a first data entry comprising the tracking parameter, the first input parameter, and the performance parameter in a database;
extracting the first data entry;
training a training model using the first data entry;
performing a model check to compare the training model to an inferencing model;
determining that the training model is more accurate than the inferencing model based on a comparison of a performance of the training model to a performance of the inferencing model;
updating the inferencing model by performing an inference with the training model; and
using the inferencing model to infer a second input parameter for grouping a second object IO in response to the performance parameter being outside an expected range.

8. The non-transitory computer readable medium of claim 7, wherein the method further comprises cross-validating the training model to determine a degree of error reduction of the training model and the computer code is further configured to implement the method by using a historical data entry to train or cross-validate the inferencing model.

9. The non-transitory computer readable medium of claim 8, wherein cross-validating the training model is performed according to a k-fold cross-validation method.

10. The non-transitory computer readable medium of claim 7, wherein the computer code is further configured to implement the method by pre-processing one or more data entries to remove a data entry that reduces a predictive ability of the training model.

11. The non-transitory computer readable medium of claim 7, wherein the performance parameter comprises IO operations per second, and
wherein the first input parameter comprises object group size or flash out time.

12. The non-transitory computer readable medium of claim 7, wherein the database comprises a time-series database.

13. A system comprising:
a target comprising a memory cache, the target being configured to:
receive a first object input/output (IO) for a target device;
group the first object IO with one or more other object IOs using a first input parameter;
associate a tracking parameter with the first input parameter and a performance parameter corresponding to the first input parameter, and
transmit a first data entry comprising the tracking parameter, the first input parameter, and the performance parameter to a database;
a training circuit configured to:
extract the first data entry,
train a training model using the first data entry,
perform a model check to compare the training model to an inferencing model,
determine that the training model is more accurate than the inferencing model based on a comparison of a performance of the training model to a performance of the inferencing model, and
update the inferencing model by performing an inference with the training model; and
an inferencing circuit configured to infer a second input parameter for grouping a second object IO in response to the target determining that the performance parameter is outside an expected range.

14. The system of claim 13, wherein the training circuit is further configured to cross-validate the training model to determine a degree of error reduction of the training model and use a historical data entry to train or cross-validate the inferencing model.

15. The system of claim 13, wherein the training circuit is further configured to pre-process one or more data entries to remove a data entry that reduces a predictive ability of the training model.

16. The system of claim 13, wherein the performance parameter comprises input/output operations per second, and
wherein the first input parameter comprises object group size or flash out time.

17. The system of claim 13, wherein the database comprises a time-series database.

* * * * *